US009714774B2

(12) United States Patent
Boros et al.

(10) Patent No.: US 9,714,774 B2
(45) Date of Patent: Jul. 25, 2017

(54) DOWNFIRED HIGH EFFICIENCY GAS-FIRED WATER HEATER

(71) Applicant: Rheem Manufacturing Company, Atlanta, GA (US)

(72) Inventors: Jozef Boros, Montgomery, AL (US); Qian Zhang, Montgomery, AL (US); Yoshiki Semba, Montgomery, AL (US); Subbramanian Thenappan, Montgomery, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 106 days.

(21) Appl. No.: 13/942,343

(22) Filed: Jul. 15, 2013

(65) Prior Publication Data
US 2014/0053791 A1 Feb. 27, 2014

Related U.S. Application Data

(60) Provisional application No. 61/692,082, filed on Aug. 22, 2012.

(51) Int. Cl.
F24H 1/00 (2006.01)
F24H 1/20 (2006.01)
(Continued)

(52) U.S. Cl.
CPC ............ F24H 1/206 (2013.01); F22B 21/348 (2013.01); F24H 1/287 (2013.01); F24H 8/006 (2013.01); Y02B 30/106 (2013.01)

(58) Field of Classification Search
CPC .......... F24H 1/206; F24H 1/287; F24H 8/006; Y02B 30/102
(Continued)

(56) References Cited

U.S. PATENT DOCUMENTS 1,933,056 A 1/1930 Hamilton
1,935,632 A 11/1933 Handley
(Continued)

FOREIGN PATENT DOCUMENTS

EP 0445413 A2 9/1991

OTHER PUBLICATIONS

TIAX Brochure Sheet, Refined Heat Exchanger Design, Apr. 18, 2006, 1 page.

*Primary Examiner* — Alissa Tompkins
*Assistant Examiner* — John Bargero
(74) *Attorney, Agent, or Firm* — King & Spalding LLP

(57) ABSTRACT

A high efficiency downfired gas water heater is provided which has a tank for storing water to be heated, a combustion chamber extending downwardly through a top end of the tank, and a gas burner operative to create hot combustion products within the combustion chamber. At the bottom end of the tank is a transfer chamber coupled to an external discharge conduit and to a single pass heat exchanger, in the form of multiple flue tubes. extending vertically through the tank and connected to the combustion chamber. In one embodiment of the water heater the burner is a power burner which forces the combustion products sequentially through the combustion chamber, heat exchanger, transfer chamber and discharge conduit. In another embodiment of the water heater a draft inducer fan is used to draw the combustion products through this path from the combustion chamber.

22 Claims, 3 Drawing Sheets

(51) Int. Cl.
*F24H 8/00* (2006.01)
*F22B 21/34* (2006.01)
*F24H 1/28* (2006.01)

(58) Field of Classification Search
USPC .......... 122/18.3, 18.1, 49, 97, 111, 178, 510
See application file for complete search history.

(56) References Cited

U.S. PATENT DOCUMENTS

| | | |
|---|---|---|
| 4,163,430 A | 8/1979 | Neumann |
| 4,380,215 A | 4/1983 | Mendelson |
| 4,398,502 A | 8/1983 | Park |
| 4,492,185 A | 1/1985 | Kendall et al. |
| 4,541,410 A | 9/1985 | Jatana |
| 4,677,939 A | 7/1987 | Henault et al. |
| 4,768,116 A | 8/1988 | Watanabe |
| 5,022,352 A | 6/1991 | Osborne et al. |
| 5,179,914 A | 1/1993 | Moore, Jr. et al. |
| 5,195,502 A | 3/1993 | Hanning |
| 5,207,211 A | 5/1993 | Hanning et al. |
| 5,636,598 A | 6/1997 | Moore, Jr. |
| 5,666,943 A | 9/1997 | Adams |
| 5,666,944 A | 9/1997 | Ferguson |
| 5,699,756 A | 12/1997 | Ross et al. |
| 6,036,480 A | 3/2000 | Hughes et al. |
| 7,258,080 B2 | 8/2007 | Missoum et al. |
| 7,290,503 B2 | 11/2007 | Missoum et al. |
| 7,316,206 B2 | 1/2008 | Akkala et al. |
| 7,415,943 B2 | 8/2008 | Missoum et al. |
| 7,559,293 B2 | 7/2009 | Gordon et al. |
| 2003/0029441 A1 | 2/2003 | Dick |
| 2007/0051359 A1 | 3/2007 | Missoum et al. |
| 2007/0181081 A1 | 8/2007 | Missoum et al. |
| 2008/0216772 A1* | 9/2008 | Gordon ................... F24H 1/205 122/18.3 |
| 2008/0223313 A1 | 9/2008 | Arnold et al. |
| 2009/0151653 A1 | 6/2009 | Mullen et al. |
| 2009/0165733 A1 | 7/2009 | Ferguson |
| 2009/0211540 A1 | 8/2009 | Yin et al. |
| 2009/0235875 A1 | 9/2009 | Gordon et al. |
| 2009/0301406 A1 | 12/2009 | Ritsema et al. |
| 2010/0043728 A1 | 2/2010 | Ma et al. |
| 2012/0080172 A1* | 4/2012 | Pacholski ............... F24H 1/287 165/157 |

* cited by examiner

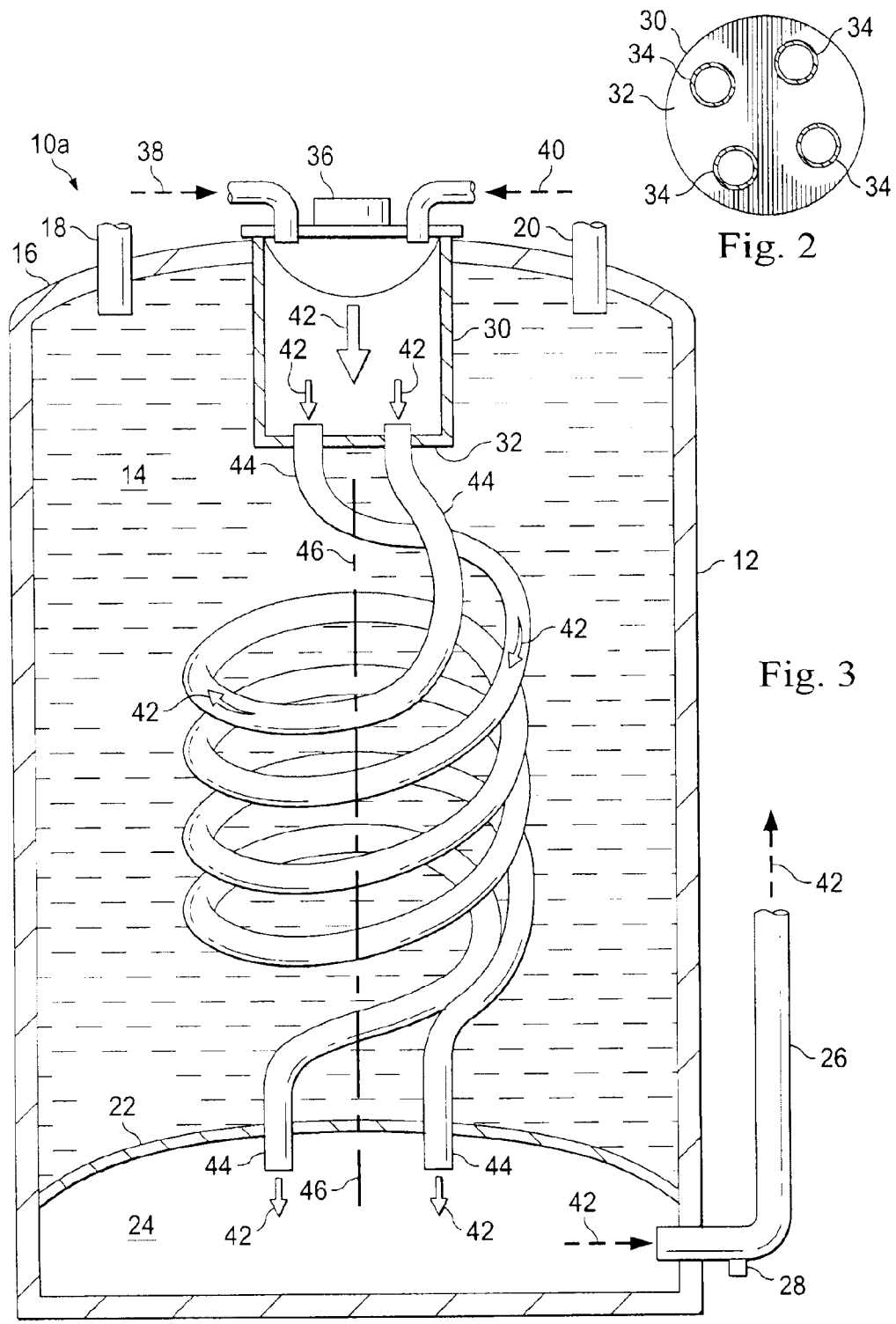

# DOWNFIRED HIGH EFFICIENCY GAS-FIRED WATER HEATER

CROSS-REFERENCE TO RELATED APPLICATION

The present application claims the benefit of the filing date of provisional U.S. patent application No. 61/692,082 filed Aug. 22, 2012. The entire disclosure of the provisional application is hereby incorporated herein by this reference.

BACKGROUND OF THE INVENTION

The present invention generally relates to fuel-fired water heaters and, in representatively illustrated embodiments thereof provides a specially designed high efficiency downfired gas water heater.

Fuel-fired storage type water heaters are commonly used in both commercial and residential applications to provide on-demand hot water to various types of hot water-utilizing plumbing fixtures such as sinks, showers, dishwashers and the like. In one conventional construction thereof, this type of water heater has a tank for holding pressurized water to be heated, a combustion chamber with a fuel burner therein for generating hot combustion products, and a flue extending through the tank interior. During firing of the water heater, hot combustion gases generated by the burner flow through the flue, with heat from the combustion gases being transferred from within the flue to stored tank water through which the flue extends.

With increasing demands for both higher energy efficiency and lowered water heater production costs, it has become necessary to design fuel-fired water heaters which are both simpler in structure and capable of transferring a greater percentage of burner-generated combustion heat to the stored tank water. It is to these design goals that the present invention is primarily directed.

BRIEF DESCRIPTION OF THE DRAWINGS

FIG. 2 is a cross-sectional view through a multi-tube flue portion of the water heater;

FIG. 3 is a schematic horizontally directed cross-sectional view through a first alternate embodiment of the water heater and FIG. 4 is a schematic horizontally directed cross-sectional view through a second alternate embodiment of the water heater.

DETAILED DESCRIPTION

Figure 1:
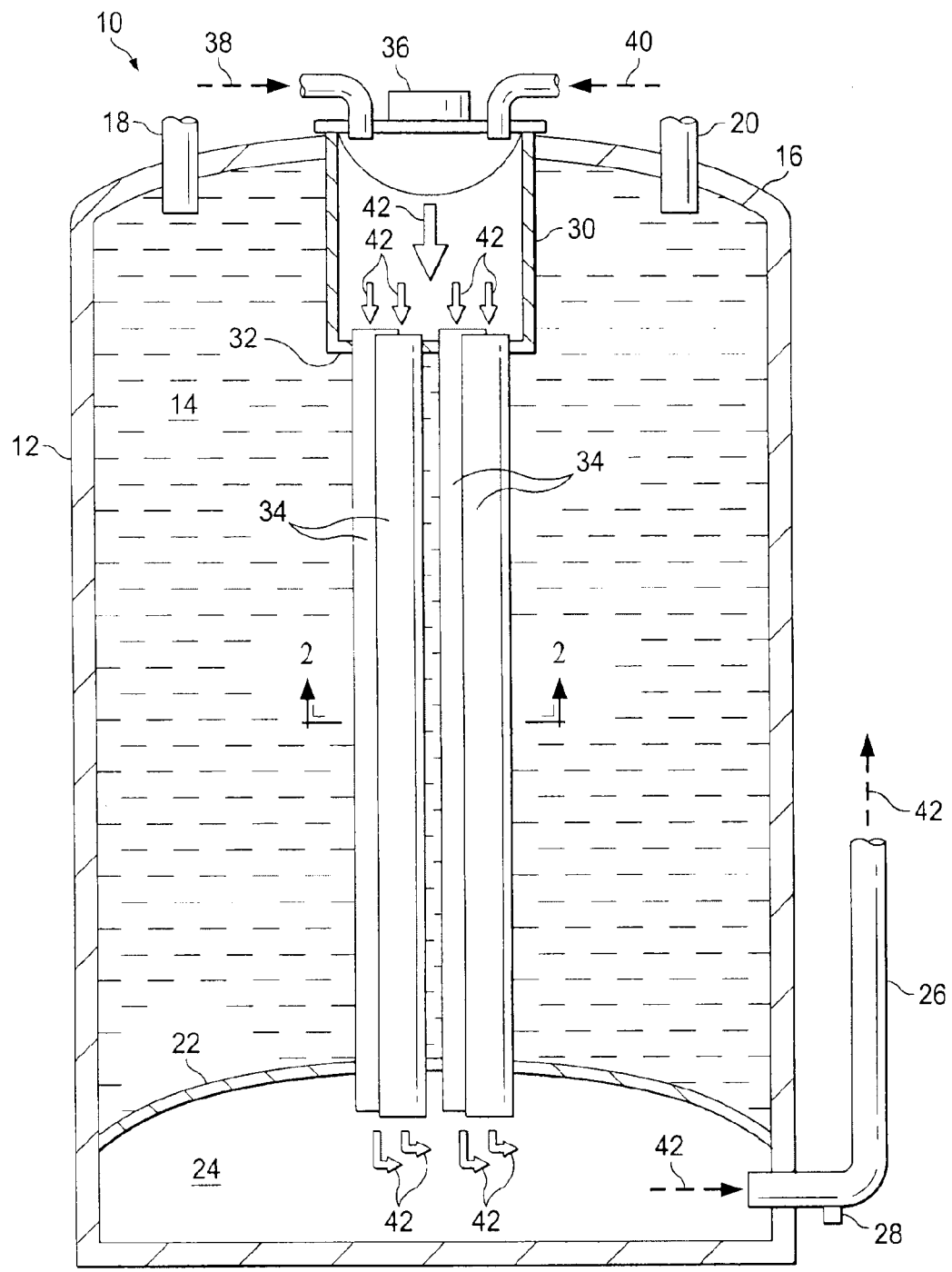
FIG. 1 is a schematic horizontally directed cross-sectional view through a downfired gas water heater embodying principles of the present invention.

Illustrated in FIGS. 1 and 2 is a downfired high efficiency gas-fired water heater 10 having a vertically oriented metal tank 12 adapted to hold a quantity of pressurized water 14 for on-demand delivery to hot water-utilizing plumbing fixtures such as, for example, sinks, tubs. showers, dishwashers and the like. Tank 12 has a top end wall 16 with a cold water inlet fitting 18 and a hot water outlet fitting 20 thereon, and a bottom end wall 22 that overlies a combustion products transfer chamber 24 with which a discharge conduit 26 with a condensate drain fitting 28 on its bottom end communicates.

A submerged tubular combustion chamber structure 30 having a bottom end wall 32 and an open top end, extends downwardly through a central portion of the top tank end wall 16. The upper ends of a plurality of vertical, open-ended flue pipes 34 (representatively four in number) are secured to the combustion chamber bottom end wall 32, with each of the flue pipes 34 intercommunicating the interiors of the combustion chamber 30 and the combustion products transfer chamber 24.

Received in the upper end of the combustion chamber 30 is a powered fuel burner 36 operative to receive fuel 38 and air 40 from sources thereof and responsively create within the combustion chamber 30 hot combustion products 42. During firing of the burner 36, the hot combustion products 42 are sequentially forced downwardly through the flue pipes 34 to transfer combustion heat therethrough to the water 14, into the combustion products transfer chamber 24, and then outwardly into and upwardly through the discharge conduit 26. Preferably, the pipes 34 define a condensing type heat exchanger, with the resulting condensate being drainable from the system via the fitting 28.

An alternate embodiment 10a of the previously described water heater 10 is shown in FIG. 3, with components in the water heater 10a similar to those in the water heater 10 having been given the same reference numerals to facilitate comparison of the water heaters 10 and 10a.

Water heater 10a is identical to the previously described water heater 10 with the exception that in place of the straight flue pipes 34 utilized in water heater 10, the water heater 10a is provided with a plurality of flue pipes 44 (representatively two in number) which are connected to the bottom end 32 of the submerged combustion chamber 30 and downwardly coil around the central vertical axis 46. Pipes 44, like the pipes 34 in the water heater 10, intercommunicate the interiors of the combustion chamber 30 and combustion products transfer chamber 24. During firing of the burner 36 of the water heater 10a, the hot combustion products 42 are sequentially forced downwardly through the pipes 42 into the chamber 24. and then outwardly from the chamber 24 into the discharge conduit 26.

Figure 4:
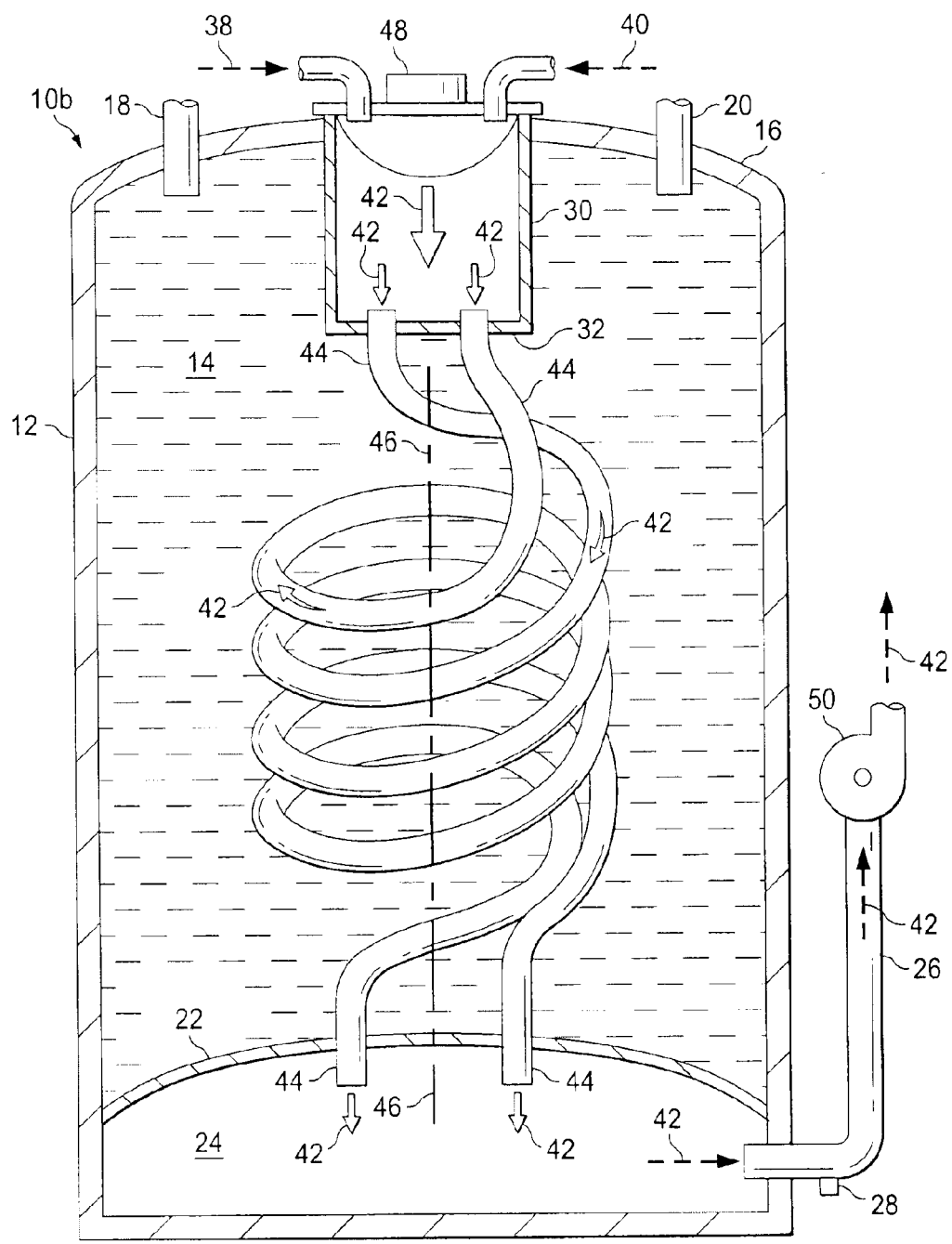

An alternate embodiment 10b of the previously described water heater 10a is shown in FIG. 4, with components in the water heater 10b similar to those in the water heater 10a having been given the same reference numerals to facilitate comparison of the water heaters 10b and 10a.

In the water heater 10b the hot combustion products 42 generated by the fuel burner 48 are not sequentially forced by the burner 48 downwardly through the combustion chamber 30, downwardly through the flue pipes 44 into the combustion products transfer chamber 24 and then outwardly into the discharge conduit 26. Instead, an induced draft blower 50 installed in the discharge conduit 26 sequentially draws the hot combustion products 42 downwardly through the combustion chamber 30, downwardly through the flue pipes 44 into the combustion products transfer chamber 24, and then outwardly into and upwardly through the discharge conduit.

During operation thereof, the induced draft blower 50 maintains negative pressures in the combustion chamber 30 and in the combustion products transfer chamber 24. thereby providing the combustion system of the water heater 10b with a "draw-through" mode of operation. While this alternate mode of combustion system operation has been representatively illustrated in conjunction with the coiled flue pipes 44 (shown in FIGS. 3 and 4) is could also be utilized in conjunction with the straight flue pipes 34 (shown in FIG. 1), if desired, without departing from principles of the present invention.

As can be seen from the foregoing, the single pass heat exchanger structure in each of the representatively illustrated downfired water heater embodiments 10-10b is of a very simple construction and provides for enhanced heat transfer from the burner-generated hot combustion products 42 to the tank water 14. In turn, this desirably reduces the temperature of the combustion products 42 entering the discharge conduit 26 and increases the overall heating efficiency of the associated water heater.

The foregoing detailed description is to be clearly understood as being given by way of illustration and example only, the spirit and scope of the present invention being limited solely by the appended claims.

What is claimed is:

1. A fuel-fired liquid heating apparatus comprising:
a tank adapted to hold a quantity of liquid to be heated, said tank having upper and lower ends;
a combustion products transfer chamber structure underlying said lower end of said tank, said combustion products transfer chamber structure being a single chamber having a top wall defined by and sized to match said lower end of said tank, said top wall being convexly shaped to be higher in a central region of said tank than at sides of said tank, said combustion products transfer chamber structure having a first sidewall;
a combustion product discharge conduit disposed externally of said tank and having an inlet end communicating directly with an interior of said combustion products transfer chamber structure through an opening in said first sidewall of said combustion products transfer chamber structure, said combustion product discharge conduit having a vertically extending portion adjacent said tank;
a partially submerged combustion chamber extending downwardly into an interior of said tank through said upper end thereof, said partially submerged combustion chamber being spaced upwardly apart from said lower end of said tank, said partially submerged combustion chamber comprising at least one second sidewall and a bottom wall that define an interior space of said partially submerged combustion chamber, and said partially submerged combustion chamber disposed in said interior of said tank such that an exterior surface of said bottom wall and at least a portion of said at least one second sidewall of said partially submerged combustion chamber are in direct contact with said quantity of liquid to be heated;
a single pass heat exchanger structure disposed in said interior of said tank and being defined by a plurality of flue pipes intercommunicating said partially submerged combustion chamber and said combustion products transfer chamber structure, said plurality of flue pipes having inlets and outlets respectively connected directly to said partially submerged combustion chamber and said combustion products transfer chamber structure, respectively, wherein said single pass heat exchanger is a condensing heat exchanger structure;
a condensate drain fitting disposed on said combustion products discharge conduit at a location adjacent a bottom of said vertically extending portion of said combustion product discharge conduit at a location laterally displaced from said tank; and
a fuel burner operative to create hot combustion products within said interior space of said partially submerged combustion chamber for transfer therefrom sequentially through said plurality of flue pipes, into said combustion products transfer chamber structure, and then outwardly from said combustion products chamber structure into said combustion products discharge conduit.

2. The fuel-fired liquid heating apparatus of claim 1 wherein:
said apparatus is a fuel-fired water heater.

3. The fuel-fired liquid heating apparatus of claim 2 wherein:
said water heater is a gas-fired water heater.

4. The fuel-fired liquid heating apparatus of claim 1 wherein:
said plurality of flue pipes have straight configurations and longitudinally extend parallel to a vertical axis extending through said tank.

5. The fuel-fired liquid heating apparatus of claim 1 wherein:
said plurality of flue pipes spiral around a vertical axis extending through said tank.

6. The fuel-fired liquid heating apparatus of claim 1:
wherein said bottom wall of said partially submerged combustion chamber has a plurality of through apertures disposed within a perimeter of said bottom wall,
wherein said plurality of through apertures disposed in said bottom wall of the said partially submerged combustion chamber are configured to receive inlets of said plurality of flue pipes therethrough,
wherein each through aperture of said plurality of through apertures has a diameter that is smaller than a diameter of said bottom wall of said partially submerged combustion chamber, and
wherein a diameter of each flue pipe of said plurality of flue pipes is smaller than said diameter of said bottom wall of said partially submerged combustion chamber.

7. The fuel-fired liquid heating apparatus of claim 1 wherein:
said fuel burner extends downwardly into said interior space of said partially submerged combustion chamber.

8. The fuel-fired liquid heating apparatus of claim 1 wherein:
said fuel burner is a powered fuel burner operative to sequentially force said hot combustion products downwardly through said partially submerged combustion chamber, downwardly through said flue pipes into said combustion products transfer chamber structure, and then outwardly from said combustion products chamber structure into said combustion products discharge conduit.

9. The fuel-fired liquid heating apparatus of claim 1 further comprising:
an induced draft blower connected to said combustion product discharge conduit and operative to sequentially draw said hot combustion products downwardly through said partially submerged combustion chamber, downwardly through said flue pipes into said combustion products transfer chamber structure, and then outwardly from said combustion products transfer chamber structure into and through said combustion products discharge conduit.

10. The fuel-fired liquid heating apparatus of claim 9 wherein:
said induced draft blower, during operation thereof, maintains a negative pressure in said partially submerged combustion chamber and said combustion products transfer chamber structure.

11. A fuel-fired liquid heating apparatus comprising:
a tank adapted to hold a quantity of liquid to be heated, said tank having upper and lower ends;

a combustion products transfer chamber structure underlying said lower end of said tank, said combustion products transfer chamber structure being a single chamber having a top wall defined by and sized to match said lower end of said tank, said top wall being convexly shaped to be higher in a central region of said tank than at sides of said tank, said combustion products transfer chamber structure having a first sidewall;

a combustion product discharge conduit disposed externally of said tank and having an inlet end communicating directly with an interior of said combustion products transfer chamber structure through an opening in said first sidewall, said combustion product discharge conduit having a vertically extending portion adjacent said tank;

a combustion chamber extending downwardly into an interior of said tank through said upper end thereof, said combustion chamber being spaced upwardly apart from said lower end of said tank, said combustion chamber having a bottom end wall, at least one second sidewall, and a top end that define an interior space of said combustion chamber, said top end being disposed at substantially the same elevation as said upper end of the tank, and said combustion chamber disposed in said interior of said tank such that an exterior surface of said bottom end wall and at least a portion of said at least one second sidewall of said combustion chamber are in direct contact with said quantity of liquid to be heated;

a single pass heat exchanger structure disposed in said interior of said tank and being defined by a plurality of flue pipes intercommunicating said combustion chamber and said combustion products transfer chamber structure, said flue pipes having inlets and outlets respectively connected directly to said bottom end wall of said combustion chamber and said combustion products transfer chamber structure, respectively, wherein said single pass heat exchanger is a condensing heat exchanger structure;

a condensate drain fitting disposed on said combustion products discharge conduit at a location adjacent a bottom of said vertically extending portion of said combustion product discharge conduit at a location laterally displaced from said tank; and a fuel burner disposed at said top end of said combustion chamber and comprising air and fuel inlets at substantially the same elevation as the upper end of said tank, said fuel burner being operative to create hot combustion products within said interior space of said combustion chamber for transfer therefrom sequentially through said flue pipes, into said combustion products transfer chamber structure, and then outwardly from said combustion products chamber structure into said combustion products discharge conduit.

12. The fuel-fired liquid heating apparatus of claim 11 wherein:
said apparatus is a fuel-fired water heater.

13. The fuel-fired liquid heating apparatus of claim 12 wherein:
said water heater is a gas-fired water heater.

14. The fuel-fired liquid heating apparatus of claim 11 wherein:
said plurality of flue pipes have straight configurations and longitudinally extend parallel to a vertical axis extending through said tank.

15. The fuel-fired liquid heating apparatus of claim 11 wherein:
said plurality of flue pipes spiral around a vertical axis extending through said tank.

16. The fuel-fired liquid heating apparatus of claim 11 wherein:
said inlets of said plurality of flue pipes are connected directly to said bottom end wall of said combustion chamber.

17. The fuel-fired liquid heating apparatus of claim 11 wherein:
said fuel burner extends downwardly into the interior space of said combustion chamber.

18. The fuel-fired liquid heating apparatus of claim 11 wherein:
said fuel burner is a powered fuel burner operative to sequentially force said hot combustion products downwardly through said combustion chamber, downwardly through said flue pipes into said combustion products transfer chamber structure, and then outwardly from said combustion products chamber structure into said combustion products discharge conduit.

19. The fuel-fired liquid heating apparatus of claim 11 further comprising:
an induced draft blower connected to said combustion product discharge conduit and operative to sequentially draw said hot combustion products downwardly through said combustion chamber, downwardly through said flue pipes into said combustion products transfer chamber structure, and then outwardly from said combustion products transfer chamber structure into and through said combustion products discharge conduit.

20. The fuel-fired liquid heating apparatus of claim 19 wherein:
said induced draft blower, during operation thereof, maintains a negative pressure in said combustion chamber and said combustion products transfer chamber structure.

21. The fuel-fired liquid heating apparatus of claim 1 further comprising:
a fluid inlet disposed at the upper end of the tank; and
a fluid outlet disposed at the upper end of the tank,
wherein said combustion chamber has a width less than half the width of the tank, and
wherein said plurality of flue pipes extend downwardly lower than said top wall of said combustion products transfer chamber structure.

22. The fuel-fired liquid heating apparatus of claim 11 further comprising:
a fluid inlet disposed at the upper end of the tank; and
a fluid outlet disposed at the upper end of the tank,
wherein said combustion chamber has a width less than half the width of the tank, and
wherein said plurality of flue pipes extend downwardly lower than said top wall of said combustion products transfer chamber structure.

* * * * *